March 6, 1934.  F. BROOMFIELD  1,949,449

SPECTACLES

Filed June 14, 1933

Frank Broomfield
INVENTOR

BY Mock & Blum
ATTORNEYS.

Patented Mar. 6, 1934

1,949,449

UNITED STATES PATENT OFFICE 1,949,449

SPECTACLES

Frank Broomfield, Ridgewood, N. J.

Application June 14, 1933, Serial No. 675,667

8 Claims. (Cl. 88—41)

My invention relates to new and improved spectacles, eyeglasses, etc.

One of the objects of my invention is to provide eyeglasses or spectacles, either frameless or provided with frames, having main lenses, and also having supplemental lenses which can be moved into and out of operative position.

Another object of my invention is to provide an improved bifocal lens combination, in which the main lens is adapted for far vision (for example), a movable supplemental lens being provided for near vision.

Another object of my invention is to provide a device of this type in which the supplemental lenses are mounted adjacent the inner portions of the main lenses, so that the mount of said supplemental lenses is independent of and is spaced from the ear pieces.

Other objects of my invention will be set forth in the following description and drawing which illustrate a preferred embodiment thereof, it being understood that the above general statement of the objects of my invention is intended merely to generally explain the same and not to limit it in any manner.

Figure 1:
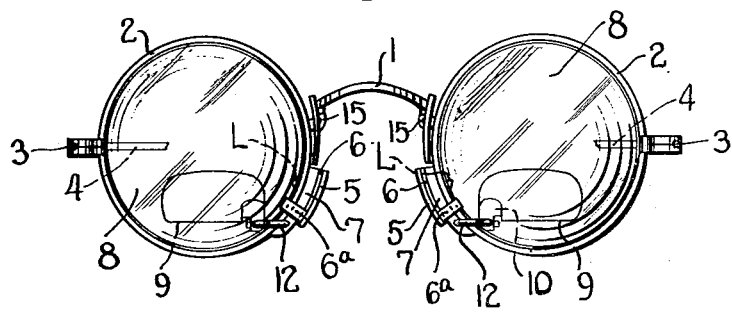
Fig. 1 is a front elevation.
Figure 2:
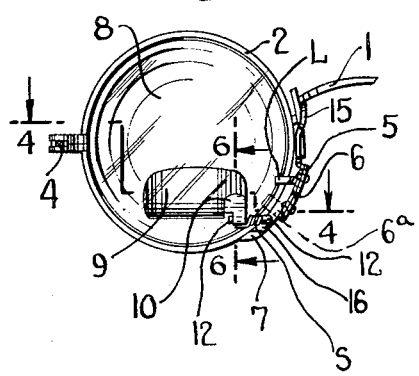
Fig. 2 is a rear elevation of one of the sets of lenses.

Both Figs. 1 and 2 show the supplemental lenses in the operative position.

Figure 3:
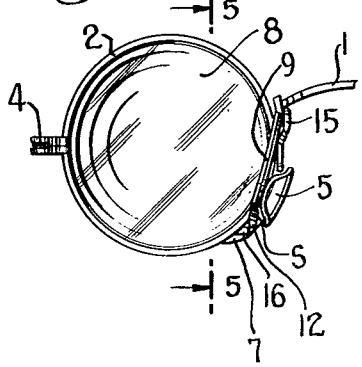

Fig. 3 is a view similar to Fig. 2 showing the supplemental lens in the inoperative position.

Figure 4:
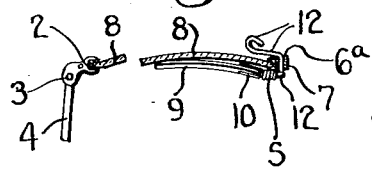
Figure 6:
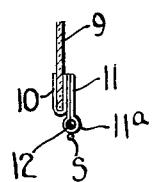
Figure 5:
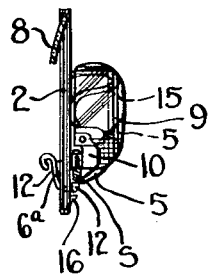

Figs. 4, 5, and 6 are respectively sectional views on the lines 4—4, 5—5 and 6—6.

It has heretofore been well known to provide a bifocal lens consisting of two lens members which were fused to each other so that the upper part of the combination lens was suited for far vision, and the lower part of the vision lens was suited for near vision or reading. However, this type of lens has a decided disadvantage in that the vision is blurred if it is necessary to look through the lower part of the lens at an object which is at some distance from the eye.

According to my invention, I provide two separate lenses, the main lens being adapted for far vision and the supplemental lens being movably mounted so that the lower part of the device is suitable for reading or near vision, when the supplemental lens is in the operative position.

While I have shown the improvement embodied in spectacles having a frame, the improvement could be embodied in frameless spectacles, in eyeglasses, etc.

Referring to the specific embodiment shown, the device has a bridge or nose piece 1 and frames 2. The frames 2 are provided with hinge members 3 to which the ear pieces 4 are connected in the usual manner. The adjacent portions of the frames 2 are provided with nose pieces 5. The nose pieces 5 are connected by rivets or the like to plates 6, and the plates 6 are connected to plates 7 which are suitably connected to the frames 2.

If desired, soldering or the like may be used for connecting the various parts of the device and I do not wish to be limited to the constructional details shown herein.

The main lenses 8 are held in the frames 2 in the usual manner. The supplemental lenses 9 are held in clips 10. The clips 10 are soldered or otherwise suitably connected to mounts 11 and said mounts 11 are provided with eyes 11a through which pivot arms 12 pass. The pivot arms 12 are U-shaped so that each said pivot arm has a portion which is located in front of the main lens. Each member 11 can also turn with respect to its pivot arm 12.

Each U-shaped pivot arm 12 is provided with a helical torsion spring S. One end of each said spring S is soldered or otherwise suitably fastened to the eye 11a of the adjacent member 11, and the other end of said torsion spring S is soldered or otherwise suitably connected to the adjacent part of the arm 12. Each member 6 is provided with a cam-lug L.

Each of the arms 12 may have a bent finger hold which is located in front of the main lens, this finger hold being clearly shown in Fig. 4.

When the supplemental lenses 9 are in the position shown in Fig. 1, the combined curvature of each said lens 9 and the adjacent part of the main lens 8 is adapted for near vision or near reading. When it is desired to use the device for far vision, the arms 12 are gripped by means of their finger holds, and said arms are turned upwardly. Said arms 12 pass through the members 7, thus providing a pivotal movement around a horizontal axis. When the lenses 9 are thus turned upwardly, each said lens contacts with its respective cam-lug L, and this causes the members 11 to turn around the arms 12, so that the supplemental lenses finally assume the inoperative position shown in Fig. 3. In this position the supplemental lenses rest against the nose pieces 5 and they also rest against lugs 15 which extend inwardly from the nose piece 1.

The torsion springs S operate to hold the lenses 9 in the operative position shown in Fig. 2, so that said lenses are held horizontal and pressed against main lenses 8.

Each arm 12 is made of springy wire and when said arm is turned to its inoperative position it springs over a lug 6a, which is a lateral extension of the plate 6. The arm 12 thus frictionally retains the lens 9 in the inoperative position shown in Fig. 3.

The inner sides of the members 7 are provided with stops 16 which limit the downward turning movements of the arms 12.

When the ear pieces 4 are turned to the horizontal or inoperative position which is shown in Fig. 1, said ear pieces can be located in the spaces between the lugs 15 and the nose pieces 5.

When the supplemental lenses are in the inoperative position, they are substantially perpendicular to the main lenses. It will be noted that the ear pieces can be omitted, so that the invention can be applied to eye-glasses of the pince-nez type. This is because each supplemental lens is turnably associated with the inner part of the main lens, that is, adjacent the bridge. If the spectacles or eyeglasses are of the frameless type, the parts for supporting the supplemental lenses can be suitably connected to the main lenses.

While the lenses are not planar, each of said lenses may be considered as having a general reference plane. The supplemental lens can have its plane tilted with respect to the plane of the main lens. The parts 5, 6 and 7 could be made integral, if desired, so as to provide a support for the arm 12.

I have shown one embodiment of my invention, but it is clear that numerous changes and omissions could be made without departing from its spirit. I have shown a complete combination, but the invention includes numerous valuable sub-combinations.

I claim:

1. In combination, a main lens, an arm turnably associated with said main lens and turnable about a horizontal axis, and a supplemental lens having a mount which is movable in unison with and which is also turnable relative to said arm, so that said supplemental lens can have its plane transversely tilted with respect to the plane of the main lens.

2. In combination, a main lens, an arm turnably associated with the inner part of said main lens and turnable about a horizontal axis, and a supplemental lens having a mount which is movable in unison with and which is also turnable relative to said arm, so that said supplemental lens can have its plane transversely tilted with respect to the plane of the main lens.

3. In combination, a main lens, an arm located in front of and also behind said main lens and turnably associated with said main lens, said arm being turnable about a horizontal axis, and a supplemental lens movable in unison with and also turnably mounted on said arm, so that said supplemental lens can have its plane tilted transversely with respect to the plane of the main lens.

4. In combination, a main lens, an arm turnably associated with said main lens and turnable about a horizontal axis, and a supplemental lens movable in unison with and also turnably mounted on said arm, so that said supplemental lens can have its plane tilted transversely with respect to the plane of the main lens, and resilient means adapted to hold the supplemental lens in inoperative position, in which it is tilted with respect to the main lens.

5. In combination, a main lens, an arm turnably associated with the inner part of said main lens and turnable about a horizontal axis, and a supplemental lens movable in unison with and also turnably mounted on said arm, so that said supplemental lens can have its plane transversely tilted with respect to the plane of the main lens, and a device adapted to transversely tilt said supplemental lens when said arm is turned upwardly.

6. In combination, a main lens, a support connected to said lens adjacent the inner portion of its edge, an arm turnably connected to said support and turnable about a horizontal axis, a supplemental lens, a holder for said supplemental lens turnably mounted on said arm, and a cam lug forming part of said support and adapted to turn said holder when the arm is turned upwardly.

7. In combination, a main lens, a support connected to said lens adjacent the inner portion of its edge, an arm turnably connected to said support and turnable about a horizontal axis, a supplemental lens, a holder for said supplemental lens turnably mounted on said arm, and a cam lug forming part of said support and adapted to turn said holder when the arm is turned upwardly, and a spring connected to said holder and to said arm and adapted to hold the supplemental lens parallel to the main lens.

8. In combination, a main lens, a support connected to said lens adjacent the inner portion of its edge, an arm turnably connected to said support and turnable about a horizontal axis, a supplemental lens, a holder for said supplemental lens turnably mounted on said arm, and a cam lug forming part of said support and adapted to turn said holder when the arm is turned upwardly, said support having a holding lug and said arm being resilient and engaging said holding lug when the arm is turned upwardly.

FRANK BROOMFIELD.